July 22, 1969  J. P. SEXTON, JR  3,456,429
SUGARCANE HARVESTING APPARATUS
Filed Feb. 3, 1966  4 Sheets-Sheet 1

INVENTOR.
Joseph P. Sexton, Jr.
BY
ATTORNEYS

INVENTOR.
JOSEPH P. SEXTON, JR
BY
Cushman, Darby & Cushman
ATTORNEYS

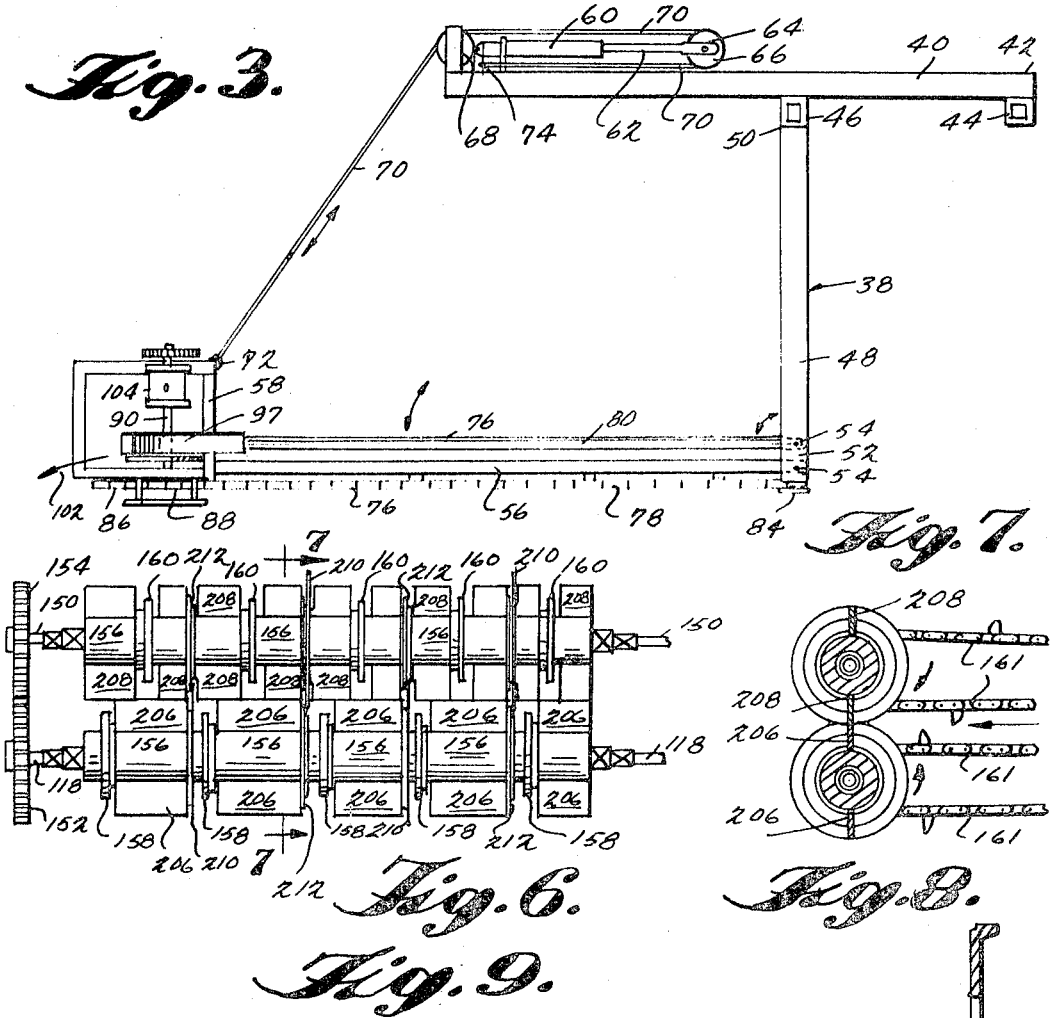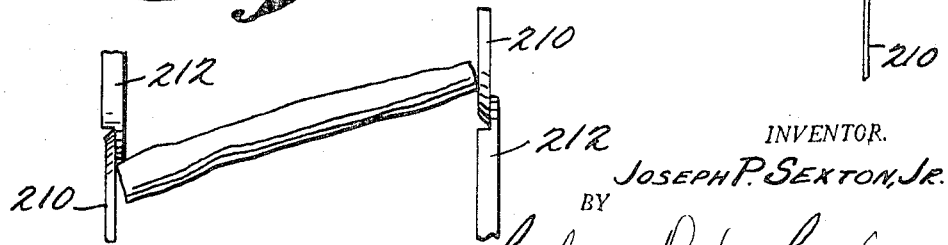

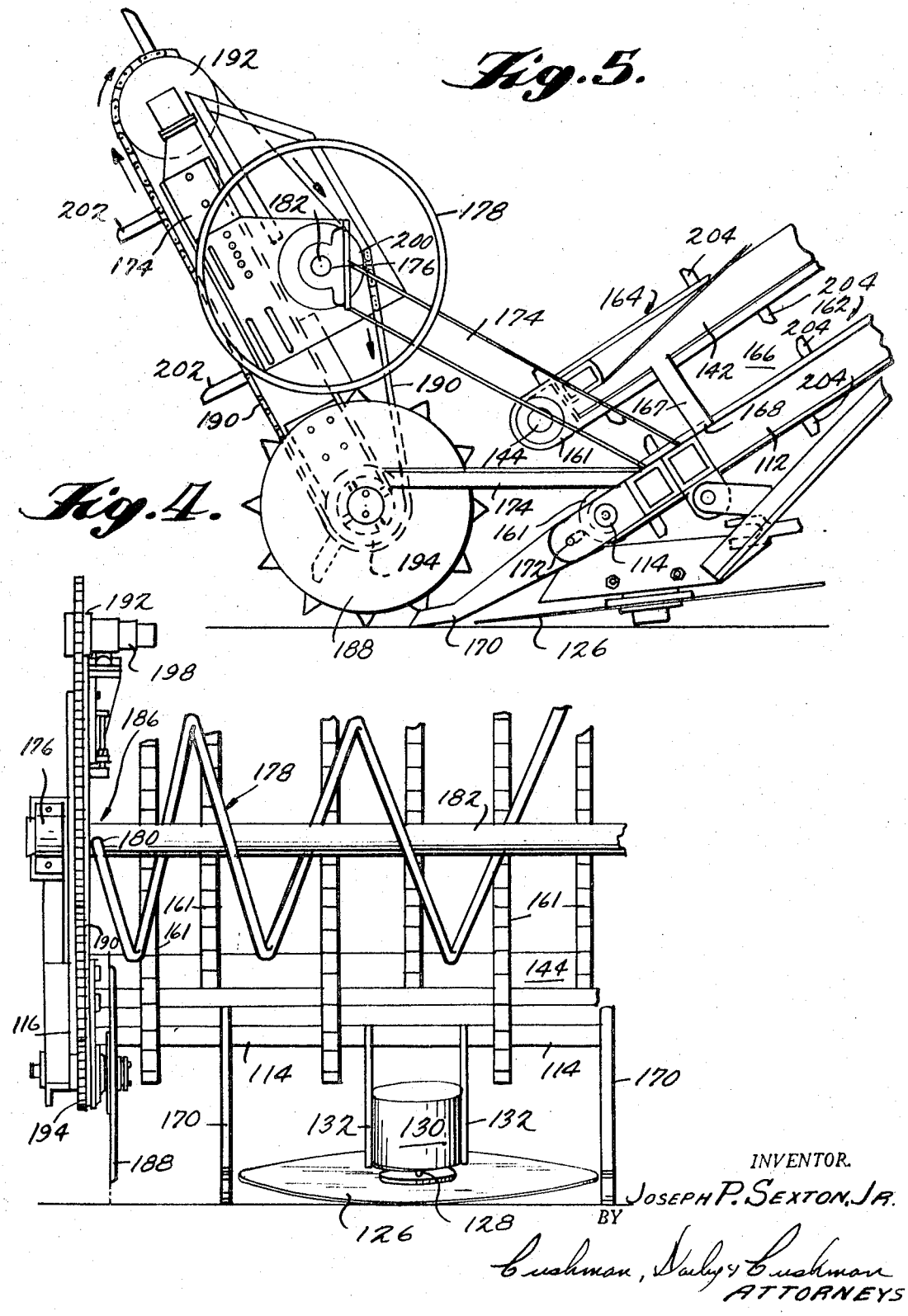

United States Patent Office 3,456,429
Patented July 22, 1969

3,456,429
SUGARCANE HARVESTING APPARATUS
Joseph P. Sexton, Jr., Clewiston, Fla., assignor to United States Sugar Corporation, Clewiston, Fla., a corporation of Delaware
Filed Feb. 3, 1966, Ser. No. 524,879
Int. Cl. A01d 45/10, 47/00
U.S. Cl. 56—16     11 Claims

ABSTRACT OF THE DISCLOSURE

The sugarcane harvesting apparatus simultaneously tops sugarcane of a first row and severs, collects, chops and delivers to a collecting device previously topped cane of an adjacent second row.

---

The present invention relates to agriculture-machinery and more particularly to apparatus for harvesting sugarcane.

Florida, like most sugar producing areas in the world, has unique problems which have thus far prevented successful innovation and construction of a mechanical harvester for sugarcane which can produce an efficiently millable product. Post harvesting operations such as transportation of the cut cane to the mill, unloading, crushing and grinding, clarification evaporation, boiling, molasses-sugar centrifugal separation, and loading for shipment have all been mechanized and automated with sufficient success that the lack, heretofore, of a successful harvester has represented a serious bottleneck of growing importance to the industry.

One cane harvesting problem is the recumbent or semi-recumbent habit of Florida sugar cane particularly after a good season. Apt illustrations of Florida sugarcane growth habit are shown in the drawings in the commonly assigned U.S. Plant Patents of Weetman et al. 2461, 2510, 2511 and 2584. Heaviness of the cane, soft ground (often peat), and sometimes wind contribute to causing the cane to hug the ground as it grows. Those skilled in the art realize that the part of the cane adjacent the roots contains the major portion of the sucrose recoverable from the cane. For this reason it is highly important to cut the cane as close to the ground as possible and the recumbent habit of the cane has heretofore made close cutting by a mechanized cutter extremely difficult.

Just as the lower part of the cane is richest in sucrose, the upper part of the cane is lean in sucrose due to immaturity of the upper part of the stalks at harvest time when the remainder of the stalks is mature, because the upper parts have deteriorated due to freezing of the cane (freeze deterioration starts from the top of the cane and progresses downwardly), and because the tops include some trash (foliage etc.) even after a field has been burned.

The economics of sugar mill operation dictate that as much as possible of the trash which contains little sucrose be eliminated early in the processing operation in order to minimize transportation costs of hauling unproductive material, and maximize efficient usage of the juice-bagasse separation equipment at the mill.

In addition, the immature tops of sugarcane contain waxes and other impurities which hinder the proper operation of clarification equipment in the mill and render clarification extremely difficult, dictating removal of the cane tops at an early step in processing of the cane, preferably while harvesting the cane.

In some other sugar growing areas where cane matures with an erect habit the cane can be topped by determining an average height above the ground at which the cane stalks should be topped, setting a cutter at this height and proceeding to top the cane.

The unevenness of growth, due to the recumbent cane in Florida does not permit such apparatus to be successfully used there. As an illustration, it is not uncommon to have one stalk with its top three feet above the ground lying across a row leaning against another stalk with its top eleven feet above the ground.

Some have attempted to regularize the rows prior to topping using air blasts, mechanical sorting fingers and the like but have not met with an acceptable level of success due to the entangled nature of the stalks and the softness of the ground, which often results in pulling the cane out by the roots when such cane straightening attempts are made.

Accordingly, it is a primary object of the invention to provide cane harvesting apparatus which overcomes each of the problems just discussed.

More specifically, it is an object of the invention to provide sugarcane harvesting apparatus operable to top cane of irregular height so as to remove neither too much nor too little of the upper part of the cane stalks, to sever the topped stalks close to the ground regardless of stalk orientation, lift the severed stalks and chop them into short lengths regardless of their orientation upon reaching the chopping mechanism, and conveying the chopped stalks to collecting means for transport to the mill.

It is a further object of the invention to provide apparatus for laying down erect sugarcane, gathering both erect and recumbent sugarcane, severing such cane very close to the ground, cutting the cane stalks into short pieces and delivering it to a container moving beside the harvesting apparatus.

A further object of the present invention is the provision of a novel method for topping sugarcane.

Another object of the invention is the provision of sugarcane harvesting apparatus constructed and arranged to simultaneously top sugarcane in one swath, and sever, collect, chop and deliver previously topped cane in an adjacent swath.

These and further objects of the present invention will become more readily apparent during the course of the following detailed discussion which is particularly keyed to the illustrative preferred embodiment of the apparatus of the invention shown in the attached drawings.

In the drawings:

FIGURE 3 is a right side elevation view of the topping apparatus shown at bottom left in FIGURE 2;

FIGURE 4 is a fragmentary enlarged front elevation view of the cane harvesting machine;

FIGURE 5 is a fragmentary enlarged left side elevation of substantially the same portion of the cane harvesting machine as is illustrated in FIGURE 4;

FIGURE 6 is a front elevation view of the severed stalk chopping device of the novel cane harvester;

FIGURE 7 is a sectional view taken substantially along the line 7—7 of FIGURE 6;

FIGURE 8 is a fragmentary front elevation view, drawn to an expanded scale, illustrating the rolling engagement of one knife and one back plate of the novel stalk chopping device shown in FIGURES 6 and 7;

FIGURE 9 is a diagrammatic front elevation view of prior art stalk chopping apparatus illustrating a frequently occurring shortcoming thereof; and FIGURE 10 is a view similar to FIGURE 9 of the novel stalk chopping of the present invention, illustrating the manner in which prior art shortcomings are overcome therewith.

Figure 1:
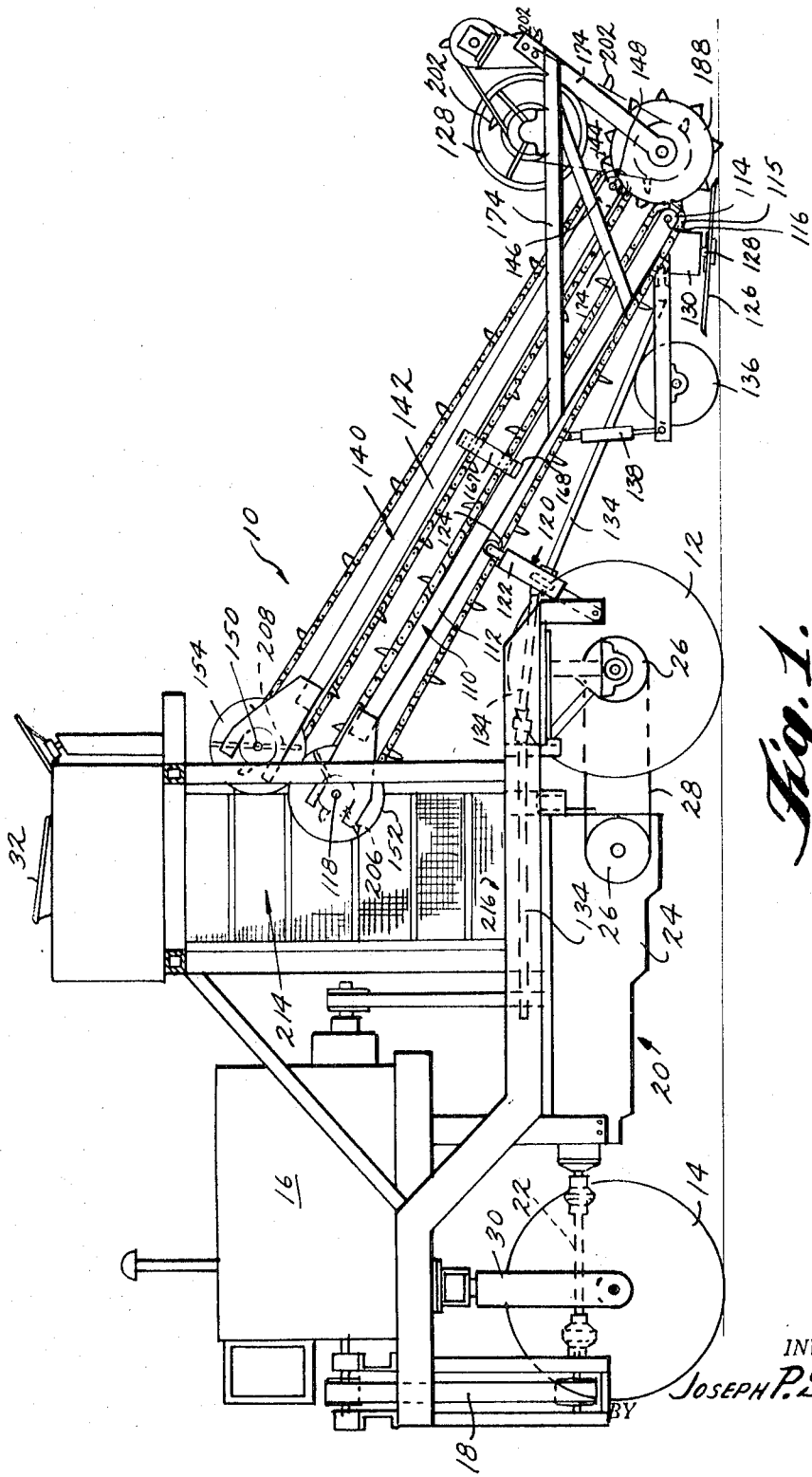
FIGURE 1 is a right side elevation view of the novel cane harvesting machine with the topping apparatus which would be in the left foreground removed.
Figure 2:
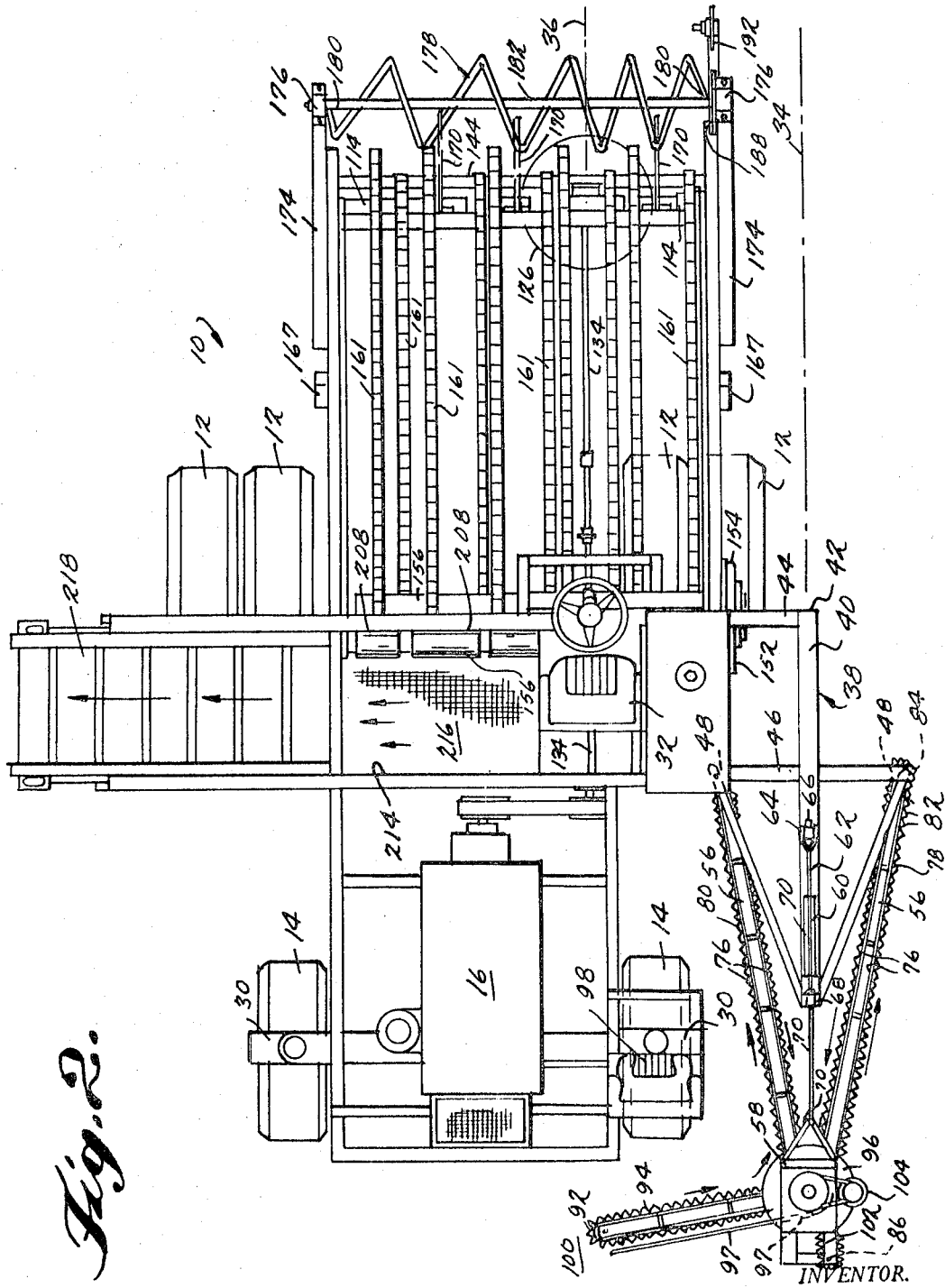
FIGURE 2 is a top plan view of the novel cane harvesting machine.

The sugarcane harvester 10 of FIGURES 1 and 2 is a self-propelled land vehicle having front wheels 12 and rear wheels 14, the former being driven from an engine 16 via belting 18 and power train 20 including universals 22, transmission 24, sprockets 26 and endless chains 28. The rear wheels 14 are steerable with swivelable yokes 30 from the operator's perch 32.

The harvester 10 is adapted to proceed longitudinally of sugarcane rows operating simultaneously on a first row indicated at 34 to sever the cane tops and on a second row indicated at 36 to sever the cane stalks at the ground. The first row cane topped in a first pass of the harvester become the cane of the second row to be severed from the ground during a second pass of the harvester. It is considered an advantage that the harvester 10 not both top cane and sever cane stalks of one or more rows in a single pass since the two pass operation leaves a desirable intervening period for field hands to get into the exposed row of topped cane to remove trash, missed tops and generally clean up the cane where necessary so that when the cane is severed on the second pass the harvested cane stalks will be substantially as free of trash and tops as manually harvested cane stalks.

With attention to FIGURES 2 and 3, the harvester 10 chassis should be seen to include a bracket 38 on its right side. The bracket 38 illustrated includes an upper, horizontal, longitudinally directed bar 40, fixed at its forward end 42 to a transverse appendage 44 of the vehicle. The bar 40 is further braced with respect to the vehicle by a second transverse appendage 46 secured to the vehicle at its inner end and to the bar 40 intermediate the ends of the bar 40 and intermediate its own ends. At two transversely spaced points, vertical bars 48 are secured to the appendage 46 at their upper ends 50 and depend from the appendage 46. Near the lower ends 52, the bars 48 are provided with horizontal, transversely directed pivot pin arrangements 54 by which the forward ends of two topper chain support arms 56 are pivotally secured to the bars 48. The arms 56 converge rearwardly of the vehicle and are joined to a frame 58 at their rearward ends.

A hydraulic cylinder 60 is mounted on the upper surface of the bar 40 so as to extend longitudinally therealong intermediate and above the arms 56. The cylinder 60 has a piston rod 62 extending longitudinally from its forward end. The piston rod is adapted to be axially advanced forwardly and retracted upon the conventional application of fluid pressure to opposite sides of the piston (not shown) within the cylinder. A forwardly opening bifurcated yoke 64 at the forward end of the piston rod 62 mounts a pulley 66 for rotation about its own horizontal, transversely oriented central axis. A second, similarly oriented pulley 68 is rotatably mounted on the upper surface of the rod 40 at the rearward end thereof behind the cylinder 60.

A flexible, relatively inextensible cable 70 is shown secured at one end 72 to the frame 58, extending upwardly and forwardly clockwise about part of the periphery of the pulley 68, horizontally forwardly and clockwise about part of the periphery of the pulley 66 then horizontally and rearwardly to a fixed mounting at 74 with respect to the cylinder 60 and bar 40. Accordingly, it can be seen that when the piston rod 62 is extended, the frame 58 will be pulled upwardly causing the arms 56 to pivot upwardly about the points 54.

The arms 56 include generally outwardly U-shaped chain guides 76, which support endless chains 78, 80 shown having delta-shaped teeth 82. The chain 78, outermost from the vehicle chassis, runs about sprockets 84, 86 mounted at the forward end of the respective topper arm and on the frame 58 respectively. A drive sprocket at 88 driven by the shaft 90 powers the chain 78 for rotation in the direction of the arrows in FIGURE 2.

The chain 80 runs about a drive sprocket and direction changing idler pulley (not shown) respectively on and adjacent the drive shaft 90 and about an idler sprocket 92 rotatably positioned at the end of an arm 94 which projects leftwardly and rearwardly from the frame 58. The arm 94 extends in a substantially horizontal plane.

The drive shaft 90 also mounts a disk-like cutting blade 96 substantially at the convergence point of the arms 56. A curved metal plate 97 extends from the right side of the approach to the cutting blade 96, above and at a smaller radius than the blade and parallel to adjacent and at the same height as the arm 94 rearwardly of the arm 94 and nearly to its outer extent.

A topper operator sitting at 98 in FIGURE 2 controls the vertical height of the convergence of the arms 56 by supplying pressurized fluid through conventional lines (not shown) to the hydraulic cylinder 60.

Accordingly, as the harvester is driven through the cane field, the topper visually determines the proper topping height of the first row cane being guided toward the convergence of the arms 56 by the sticker chains 78, 80 rotating as illustrated in FIGURE 2 and raises and lowers the convergence point by operating the cylinder 60. The chains 78, 80 thus serve to erect the cane and feed it to the topping blade 96 where the tops are severed from the cane and grasped between the delta teeth of the sticker chain 80 and the curved metal plate 97 and deposited at 100 behind the machine on an already harvested part of the field where it will not be in the path of the harvester or have to be processed again. The chains 78 and 80 run at somewhat different vertical heights primarily so that after the tops have been severed from the cane, the chain 78 becomes freed from them and in order to facilitate sprocket location with minimum interference and allow the topped cane stalks still attached to the ground to pass out rearwardly at 102 aided by the chain 78.

The shaft 90 is shown powered via a motor 104 although power train means could easily be provided to operate it from the vehicle engine.

The features of the harvester 10 which operate on the topped stalks during the second pass of the apparatus will now be discussed.

Projecting longitudinally forwardly and downwardly from high on the front of the harvester chassis is a first conveyor frame 110 comprising two opposite side members 112 pivotally secured to the chassis at their upper, rearward ends for pivoting about a horizontal transverse axis. Preferably the frame 110 also includes a plurality of transverse braces extending between and secured to the members 112, these braces have been omitted from the figures. At the forward, lower end of the first conveyor frame 110, a transverse, horizontal fixed shaft 114, having a plurality of idler sprockets 115 journalled on it along its length is mounted on the frame at 116. At its upper, rearward end, the frame 110 mounts a transverse, horizontal shaft 118, journalled for powered rotation about its own longitudinal axis.

Intermediate its rearward upper and forward lower ends, the frame 110 is supported with respect to the frame via a hydraulic jack 120 including a cylinder 122 and an extensible piston rod 124. A circular cutting knife 126 constructed and arranged to cut sugarcane stalks off substantially at the ground is shown mounted for powered rotation on a shaft 128 that is journalled in a housing 130 mounted via brackets 132 on the shaft 114. The blade 126 is preferably tipped slightly downward forwardly as best shown in FIGURE 1 so that its cutting periphery is adjacent the ground centrally of the transverse width of the knife and at its forward extent at any moment. This minimizes the effect of bumpy terrain and centers the lowest cutting point at the region where cane is most likely to be encountered, i.e. in the row.

The ground knife 126 is shown driven by a double-universal shaft 134 ultimately receiving power from the vehicle engine. A gauge wheel 136 mounted on the frame 110 just behind the knife 126 is arranged to engage the ground and provide an indication, for instance via the hydraulic piston and cylinder assembly 138 of variation in terrain in order to maintain the blade 126 at a fixed distance by effecting a proportionate retraction of the piston rod 124 upon sensing a depression in terrain and a proportionate extension of the piston rod 124 upon sensing an elevation in terrain. To provide such sensation action, suitable conventional hydraulic lines may be provided between the assembly 138 and cylinder 122. In addition, further conventional hydraulic lines (not shown) connect the cylinder 122 with the first operator's console atop the vehicle so that upon reaching the end of a row, the operator can fully extend the piston rod 124 to raise the cane gathering equipment up from the ground to facilitate a rapid procession up-field.

Also projecting longitudinally forwardly and downwardly from high on the front of the harvester chassis, above the first conveyor frame 110 is a second conveyor frame 140 comprising two opposite side members 142 pivotally secured to the chassis at their upper, rearward ends for pivoting about a horizontal transverse axis. Preferably, like the first frame 110, the second frame includes a plurality of transverse braces (not shown) extending between and secured to the two opposite side members 142. At the forward, lower end of the second conveyor frame, approximately vertically above the corresponding part of the first conveyor frame, a transverse, horizontal shaft 144 having a plurality of idler sprockets 146 journalled on it along its length, is mounted on the second conveyor frame at 148. At its upper, rearward end, the second conveyor frame mounts a transverse, horizontal shaft 150 journalled for powered rotation about its own longitudinal axis.

The shafts 118 and 150 are preferably mounted via sleeve bearings or the like, fixed to the vehicle chassis at the transverse extremes of the front of the chassis and are thus parallel and in fixed lateral distance from one another.

Meshing gears 152, 154 are fixedly mounted at one end of each shaft 118, 150 in order to time their counter rotation with respect to one another. A conventional power train (not shown) from the vehicle engine provides rotative power to the shafts 118, 150.

The shafts 118 and 150 each have circumferentially surrounding drums 156 fixed along their length. The drums are shown in FIGURE 6 interrupted at several points along the shaft where sprockets 158, 160 are fixedly mounted on the shafts 118, 150 for rotation therewith. As shown, the sprockets 158 on the shaft 118 are out of vertical registry with the sprockets 160 on the shaft 150. However, the sprockets 158 on shaft 118 are aligned with the sprockets 115 on the shaft 114 and the sprockets 160 on the shaft 150 are aligned with the sprockets 146 on the shaft 144 forming sprocket pairs between the forward and rear shafts on each conveyor frame. As best seen in FIGURES 1, 2, 4, 5 and 7 an endless conveyor chain 161 is mounted between each sprocket pair forming a lower conveyor 162 and an upper conveyor 164 rotatable in the direction of the arrows (FIGURES 1 and 5) to convey severed cane stalks upwardly and rearwardly between the two conveyor frames in the space 166. Conventional trough-like chain guides (not shown) are preferably provided for the chains 161 for at least parts of their travel path.

In order to support the lower region of the upper conveyor 164, arms 167 are secured to the lateral margin of its frame and project downwardly to rest on lateral ears 168 projecting from the frame of the lower conveyor 162. Accordingly, when a particularly bunched mass of cane stalks is being conveyed, the upper conveyor can pivot upwardly about its upper end to increase the vertical height of the space 166 somewhat.

With particular attention to the detail views, FIGURES 4 and 5, the harvester 10 includes a plurality of longitudinally forwardly and downwardly projecting fingers 170 on the frame 110 lower front end on each side of the ground knife 126. The fingers 170 project further forwardly than the knife 126 as shown in FIGURE 5 and are adjustable via nut and bolt assembly and slot arrangements at 172 to increase and decrease the amount of lead. The fingers 170 serve to wedge under recumbent cane and lift it into the path of the ground knife 126 and conveyors 162, 164 as the harvester 10 progresses forwardly.

Longitudinally forwardly and upwardly extending brackets 174 mounted on the frame 110 side members 112 journal at 176 an auger 178 for rotation about its own longitudinal axis which is horizontal and extends transversely of the harvester. As shown the auger 178 includes a metal bar bent to form a spiral and secured at its ends 180 to a shaft 182. The auger as shown is located somewhat forwardly of and above the foremost extent of the ground knife 126 and fingers 170; exact positioning can be adjusted at 184 to accommodate particularly erect or particularly recumbent cane fields. As will be more fully explained hereinafter, as the harvester progresses through the field, the auger 178 is rotated in a sense to pivot any cane it engages, clockwise (FIGURE 4 direction) about its roots for efficient severing and pickup by the conveyors. In effect, the auger 178 makes an "instant windrow" of the cane it engages.

At the side margin 186 of the auger nearest the topper apparatus (FIGURE 2) a rotatable knife 188, for instance about two feet in diameter is mounted on the bracket 174 for rotation in a vertical plane parallel to the harvester travel path to provide during each harvester pass a clear distinction between cane to be cut by the ground knife, picked up and conveyed on the present pass of the harvester, and that which will remain in the path of the topper apparatus to be topped this pass and severed and picked up during the next pass.

The knife 188 particularly affects the cane which is nominally being severed by the knife 126 but which is so recumbent leftwardly (FIGURE 4 diertcion) that it is too low to be engaged by the auger 178.

The FIGURE 4, FIGURE 5 assembly is completed by an endless lifter chain 190 entrained about sprockets 192, 194 rotatably mounted on the same side of the bracket 174 as the knife 188. As shown, the sprocket 194 is fixed to the same shaft 196 as the knife 188 for receiving rotative power from the same drive trains as the conveyors at 198. As shown in FIGURE 5, the chain 190 is also entrained about a sprocket 200, thus providing rotative power to the auger 178. A plurality of lifting fingers 202 are spaced along the lifter chain 190 and the chain 190 rotates in the direction of the arrows of FIGURE 5 as the harvester progresses. Thus first row cane which is semirecumbent rightwardly of FIGURE 4 but not low enough to be severed by the knife 188 and fall into the path of the fingers 170 to be lifted into the conveyors is instead lifted by the lifter chain 190 into the path of the topper (FIGURE 2). In addition, second row cane which is semirecumbent leftwardly of FIGURE 4 but not low enough to be severed by the knife 188 and fall into the path of the topper for gathering on the next harvester pass is instead lifted by the lifter chain 190 into the path of the auger 178 which erects the cane as it is cut by the ground cutter 126 and contemporaneously lays it over rightwardly for pick-up by the conveyors.

It should now be apparent that cane is efficiently handled, severed and conveyed by the apparatus of the present invention regardless of cane recumbering and orientation in the field.

Once the severed cane has been lifted by the fingers 170 into the path of the conveyors 162, 164, it is engaged by projecting fingers 204 on the chains 161 and conveyed rearwardly and upwardly in the space 166.

It should now be noted, having attention to FIGURE 6, that the shafts 118, 150 have fixed thereon a plurality of fins 206, 208 which proceed longitudinally of the respective shafts 118, 150 and project radially therefrom, the fins 206, 208 being of such radial extent and rotation of the shafts 118, 150 being so timed that fins 206 and 208 abut one another at their closest approach, or in other words, are in rotative registry. Preferably, the radially outer edges of the fins 206, 208 are somewhat sharpened in order to enhance severing action between them.

It should also be noted from FIGURE 6 that a plurality of cutter disk-back-up plate sets 210, 212 are positioned along the shafts 118, 150 and fixed thereto. In the preferred embodiment shown, adjacent cutter disks 210 are on alternate of the shafts 118, 150 as are adjacent back-up plates 212. The latter are preferably also disk shaped.

Accordingly, as the severed stalks reach the top of the conveyor space 166 they are fed into the chopper including the longitudinal cutters 206, 208 and cutter disk back-up plate sets and cut into short lengths of for instance 9–18 inches long.

The chopper just described effectively solves two heretofore troublesome drawbacks to mechanical cane harvesting.

Firstly, with prior art harvesters having only cutter disks in the chopper mechanism, cane which unavoidably approached the cutters with its long axis parallel to the planes of the cutter disks could pass between adjacent of them wholly uncut and often cause jamming of processing machinery somewhere downstream in processing of such cane. With the combined transverse and longitudinal cutters provided by the present invention such cane could not pass through the chopper section uncut, regardless of its orientation in the space 166.

Secondly, prior art cutter disk cane chopping sections often become clogged with cane lengths which, after being cut between adjacent disks wedge between them and continue to whirl around (FIGURE 9) more lengths becoming completely stuck with progression of a relatively short time until the cutters are all jammed-up necessitating work stoppage for clearing of the harvester chopper section and sometimes even causing break-down of such machines. FIGURE 10 especially illustrates how the novel alternate cutter disks and back-up plates of the chopper according to the present invention cooperate to prevent cane lengths from wedging between adjacent cutter disks as they are cut.

It should be apparent from FIGURES 6, 8 and 10, the cane is cut by scissors action between the sharp cutter disks and peripherally flanged back-up plates. The slight overlap of the cutter disks and respective back-up plates as wel as the placement of adjacent cutters in counter-rotative relationship because they are on different shafts combine to ensure that each cane stalk piece is kicked into an oblique, cocked condition (FIGURE 10) as it is cut and is thus prevented from wedging.

The cut stalk pieces emerging rearwardly from the chopper section fall into the bin 214 (FIGURE 1) enclosed where necessary with grillwork or the like to prevent the cut stalk pieces from falling out on the ground. The floor of the bin 214 comprises an endless belt conveyor 216 proceding in the direction of the arrows in FIGURE 2 and thus feeding an endless conveyor 218 which elevates the cut stalk pieces and is arranged to dump them in a rubber tired train of carts (not shown) or the like being hauled by independent means along side of the harvester 10 while being filled, the filled carts then being transported to the sugar mill. The conveyors 216 and 218 are operated via conventional drive rains (not shown) from the main vehicle engine.

Although the harvester 10 has been discussed as if it were an independent, self-propelled, wheeled vehicle, suitable modifications could well be made to suit local terrain and economic conditions without departing from the principles of the present invention. For instance, the harvester 10 could be one of many working the same cane field, could be a towed vehicle and/or have half or full tracks instead of some or all of the wheels shown.

Although the harvester shown and described herein is particularly adept in efficiently harvesting sugarcane in Florida, it should be apparent to those skilled in the art and familiar with sugarcane harvesting problems that it has advantageous usefulness in other sugarcane growing areas.

From the detailed discussion hereinabove, it should now be apparent that the preferred embodiment of the invention discussed to clarify the principles of the invention, accomplishes each of the objects set forth at the outset of the specification. This illustrative embodiment can be considerably modified without departing from the invention's principles.

I claim:

1. In a sugarcane harvester adapted to be propelled along rows of sugarcane: a chassis; means on said chassis for topping a first row of sugarcane; and means on said chassis for simultaneously severing sugarcane from the ground in a second row; the severing means including a rotatable knife disk positioned adjacent the ground forward of said chassis; the harvester further including: conveyor means mounted on said chassis for transporting the severed cane to chopping means; means on said chassis receiving the transported severed cane and being constructed and arranged to chop the cane into short pieces; means mounted on said chassis for discriminating between cane in the path of said topping means and cane in the path of said rotatable knife disk, the discriminating means including an endless chain having lifter fingers thereon, said chain being mounted for circuitous movement in a vertical plane between said topping means and said knife disk, said plane being substantially parallel to the path of said harvester.

2. In a sugarcane harvester adapted to be propelled along rows of sugarcane: a chassis; means on said chassis for topping a first row of sugarcane; and means on said chassis for simultaneously severing sugarcane from the ground in a second row; the severing means including a rotatable knife disk positioned adjacent the ground forward of said chassis; the harvester further including: conveyor means mounted on said chassis for transporting the severed cane to chopping means; means on said chassis receiving the transported severed cane and being constructed and arranged to chop the cane into short pieces; means mounted on said chassis for discriminating between cane in the path of said topping means and cane in the path of said rotatable knife disk; an auger and means mounting said auger on said chassis, above and forwardly of said rotatable knife disk; said auger having a central axis positioned substantially horizontal and substantially transversely of the path of travel of said harvester, said auger being rotatable about said central axis in a sense to pivot cane engaged thereby away from the path of the topping means and transversely of the path of the harvester to thereby form a windrow of said cane as said cane is severed by said rotatable knife disk.

3. In a sugarcane harvester adapted to be propelled along rows of sugarcane: a chassis; means on said chassis for topping a first row of sugarcane; and means on said chassis for simultaneously severing sugarcane from the ground in a second row; the severing means including a rotatable knife disk positioned adjacent the ground forward of said chassis; the harvester further including: conveyor means mounted on said chassis for transporting the severed cane to chopping means; means on said chassis receiving the transported severed cane and being constructed and arranged to chop the cane into short pieces; and the conveyor means for transporting the severed cane comprising upper and lower counter-circuiting endless chain conveyors having lifting means projecting therefrom.

4. In a sugarcane harvester adapted to be propelled along rows of sugarcane: a chassis; means on said chassis for topping a first row of sugarcane; and means on said chassis for simultaneously severing sugarcane from the ground in a second row; the severing means including a rotatable knife disk positioned adjacent the ground forward of said chassis; the harvester further including: conveyor means mounted on said chassis for transporting the severed cane to chopping means; means on said chassis receiving the transported severed cane and being constructed and arranged to chop the cane into short pieces; the chopping means comprising a pair of counter-rotatable, generally parallel shafts mounted on said chassis; cooperating means on said shafts constructed and arranged to cut severed cane oriented generally parallel to said shafts as it approaches said shafts; and second cooperating means on said shafts, distinct from the first-mentioned cooperating means, the second cooperating means constructed and arranged to cut severed cane oriented generally transversely to said shafts as it approaches said shafts.

5. The harvester of claim 4 wherein the first-mentioned cooperating means comprise knife disks and knife disk back-up plates alternating on respective of said shafts.

6. The harvester of claim 5 wherein the second cooperating means comprise longitudinally extending radially projecting fins on respective of said shafts extending between said knife disks and knife disk back-up plates.

7. The harvester of claim 5 wherein each backup plate radially overlaps each respective knife disk thereby providing scissors action therebetween and preventing clogging of the spaces defined between axially adjacent of said knife disks and backup plates.

8. In a sugarcane harvester adapted to be propelled along rows of sugarcane: a chassis; means on said chassis for topping a first row of sugarcane; and means on said chassis for simultaneously severing sugarcane from the ground in a second row; means for continuously adjusting the effective height of the topper means to thereby ensure optimum topping of uneven cane along said first row; the topper means comprising a pair of rearwardly converging arms and cutting means being positioned generally at the convergence of said converging arms; the converging arms being pivotally mounted at the forward ends thereof to said chassis; a frame supporting said arms at the convergence thereof and supporting said cutting means; support means extending between said frame and said chassis; said support means being constructed and arranged to allow adjustment of the height of the frame through pivotal movement of said arms about said forward ends; an endless sticker chain mounted on each of said arms each adapted for circuitous movement about its respective arm; the sticker chains being counter-rotatable with closest approach being from forwardly of said arms to rearwardly of said arms whereby said sticker chains gather tops toward said cutting means; the cutting means comprising a rotatable knife disk; the topper means further comprising an arm secured to said frame and extending behind said chassis; a sticker chain circuiting the last mentioned arm; a curved guide plate positioned above said knife disk and rearwardly beside the last-mentioned arm; said curved guide plate being constructed and arranged to receive tops when severed by said knife disk and trap said tops against said last-mentioned arm, whereby the sticker chain circuiting said last-mentioned arm is enabled to discard the severed tops out of the way behind said harvester.

9. In a sugarcane harvester adapted to be propelled along rows of sugarcane: a chassis; means on said chassis for severing sugarcane from the ground the severing means including a rotatable knife disk positioned adjacent the ground forward of said chassis; the harvester further including: conveyor means mounted on said chassis for transporting the severed cane to chopping means; means on said chassis receiving the transported severed cane and being constructed and arranged to chop the cane into short pieces; an auger; means mounting said auger on said chassis, above and forwardly of said rotatable knife disk; said auger having a central axis positioned substantially horizontal and substantially transversely of the path of travel of said harvester, said auger being rotatable about said central axis in a sense to pivot cane engaged thereby away from the path of the topping means and transversely of the path of the harvester to thereby form a window of said cane as said cane is severed by said rotatable knife disk.

10. In a sugarcane harvester adapted to be propelled along rows of sugarcane: a chassis; means on said chassis for severing sugarcane from the ground; the severing means including a rotatable knife disk positioned adjacent the ground forward of said chassis; the harvester further including: conveyor means mounted on said chassis for transporting the severed cane to chopping means; means on said chassis receiving the transported severed cane and being constructed and arranged to chop the cane into short pieces; the chopping means comprising a pair of counter-rotatable, generally parallel shafts mounted on said chassis; cooperating means on said shafts constructed and arranged to cut severed cane oriented generally parallel to said shafts as it approaches said shafts; and second cooperating means on said shafts, distinct from the first-mentioned cooperating means, the second cooperating means constructed and arranged to cut severed cane oriented generally transversely to said shafts as it approaches said shafts.

11. In a sugarcane harvester adapted to be propelled along rows of sugarcane: a chassis; means on said chassis for topping a first row of sugarcane; and means on said chassis for simultaneously severing sugarcane from the ground in a second row; means for continuously adjusting the effective height of the topper means to thereby ensure optimum topping of uneven cane along said first row; the topper means comprising a pair of rearwardly converging arms and cutting means being positioned generally at the convergence of said converging arms; the converging arms being pivotally mounted with respect to said chassis; a frame supporting said arms at the convergence thereof and supporting said cutting means; support means extending between said frame and said chassis; said support means being constructed and arranged to allow adjustment of the height of the frame through pivotal movement of said arms with respect to said chassis; an endless sticker chain mounted on each of said arms each adapted for circuitous movement about its respective arm; the sticker chains being counter-rotatable with closest approach being from forwardly of said arms to rearwardly of said arms whereby said sticker chains gather tops toward said cutting means; the cutting means comprising a rotatable knife disk; the topper means further comprising an arm secured to said frame and extending behind said chassis; a sticker chain circuiting the last-mentioned arm; guide means extending above said knife disk and rearwardly beside the last-mentioned arm; said guide means being constructed and arranged to receive tops when severed by said knife disk and trap said tops against said last-mentioned arm, whereby the sticker chain circuiting said last-mentioned arm is enabled to discard the severed tops out of the way behind said harvester.

References Cited

UNITED STATES PATENTS

| | | | |
|---|---|---|---|
| 1,944,750 | 1/1934 | Lindgren et al. | 56—238 |
| 1,954,629 | 4/1934 | Kettenbach et al. | 56—238 |
| 2,953,886 | 9/1960 | Douglas et al. | 56—17 |
| 3,103,091 | 9/1963 | Duncan et al. | 56—16 |
| 3,325,982 | 6/1967 | Fogels et al. | 56—56 |

LUCIE H. LAUDENSLAGER, Primary Examiner

U.S. Cl. X.R.

56—17, 56, 63, 238